United States Patent
Joo et al.

[11] Patent Number: 5,930,095
[45] Date of Patent: Jul. 27, 1999

[54] SUPERCONDUCTING CURRENT LIMITING DEVICE BY INTRODUCING THE AIR GAP IN THE MAGNETIC CORE

[75] Inventors: Back Joo; Min-Seok Joo, both of 123-10, Samsung-dong, Kangnam-gu; Tae-Kuk Ko, all of Seoul, Rep. of Korea

[73] Assignees: Back Joo; Min-Seok Joo, both of Seoul, Rep. of Korea

[21] Appl. No.: 09/148,764

[22] Filed: Sep. 4, 1998

Related U.S. Application Data

[63] Continuation-in-part of application No. 08/902,694, Jul. 30, 1997, abandoned.

[30] Foreign Application Priority Data

Aug. 16, 1996 [KR] Rep. of Korea ............... 96-33880

[51] Int. Cl.$^6$ .................................................. H02H 9/00
[52] U.S. Cl. .......................... 361/58; 361/19; 505/850
[58] Field of Search ....................... 361/19, 58, 141, 361/78, 87, 93; 505/850, 851

[56] References Cited

U.S. PATENT DOCUMENTS

| | | | |
|---|---|---|---|
| 4,031,457 | 6/1977 | Oberbeck | 323/362 |
| 4,117,524 | 9/1978 | Parton et al. | 361/19 |
| 4,152,637 | 5/1979 | Oberbeck et al. | 323/250 |
| 5,153,804 | 10/1992 | Pham et al. | 361/19 |
| 5,355,275 | 10/1994 | Goodier et al. | 361/141 |

OTHER PUBLICATIONS

Minseok Joo and Tae Kuk Ko, "Novel Design and Operational Characteristics of Inductive High–Tc Superconducting Fault Current Limiter", IEEE Transactions on applied Superconductivity, vol. 7, No. 2, Jun. 1997, pp. 1005–1008.

*Primary Examiner*—Jeffrey Gaffin
*Assistant Examiner*—Michael J. Sherry
*Attorney, Agent, or Firm*—Anderson, Kill & Olick, P.C.

[57] ABSTRACT

A superconducting current limiting device protects an electric circuit from a fault current. The device comprises a magnetically saturable core having saturated and non-saturated states and an input coil for electrically coupling the core to the electric circuit, the input coil drawing a current therethrough so that a magnetic flux is generated in the core due to the current. Further, the core includes a main path for drawing the generated magnetic flux and at least two magnetic paths, a first of the magnetic paths drawing a first portion of the magnetic flux, and a second of the magnetic paths drawing a second portion of the magnetic flux and having a damping element for cancelling at least a fraction of the second portion of the magnetic flux to thereby prevent the core from getting into the saturated state.

21 Claims, 5 Drawing Sheets

SUPERCONDUCTING CURRENT LIMITING DEVICE BY INTRODUCING THE AIR GAP IN THE MAGNETIC CORE

CROSS REFERENCE TO RELATED APPLICATION

This application is a continuation-in-part of U.S. Ser. No. 08/902,694 filed on Jul. 30, 1997, now abandoned.

FIELD OF THE INVENTION

The present invention relates to a fault current limiter; and, more particularly, to a superconducting current limiting device for improving the current-limiting performance thereof by employing a magnetic core which has a gap and a damping element.

DESCRIPTION OF THE PRIOR ART

In general, most electric circuits are equipped with protective measures against an excessive current caused by a transient load impedance or power supply surge. However, the commonly used thermal fuse or circuit breaker, which opens the circuit at a predetermined current level or a current-time product, is slow acting and cannot respond to a fast acting transient. In addition, circuit breakers are available only for relatively low currents.

To overcome the above drawbacks, there have been proposed various current limiters to be employed together with the fuse or the circuit breaker. One of them is a superconducting current limiting device which takes advantage of the magnetic flux cancellation effect of a superconductor.

Referring to FIG. 1, there is illustrated the magnetic flux cancellation effect of a superconductor 100.

If the superconductor 100 is exposed to a magnetic field H inducing a current I below a critical level within the superconductor 100, the superconductor 100 is in a superconducting state. Consequently, a reverse magnetic field –H is generated due to the current I in a direction of cancelling the magnetic field H applied to the superconductor 100. As a result, the magnetic field H linking the superconductor 100 is cancelled out by the reverse magnetic field –H.

On the other hand, in the presence of a magnetic field H inducing a current exceeding the critical level within the superconductor 100, the superconductor 100 goes to a resistive state, wherein the transition from the superconducting state to the resistive state extremely weakens the reverse magnetic field –H, resulting in the loss of the magnetic flux cancellation characteristic of the superconductor 100. As a result, the magnetic field H linking the superconductor 100 is not cancelled out by the reverse magnetic field –H.

Referring now to FIG. 2, there is provided an exemplary electric device 5 employing a conventional superconducting current limiting device 10 which uses the magnetic flux cancellation effect of a superconductor. The superconducting current limiting device 10 comprises a primary winding 110, a superconductive element 120 and a saturable magnetic core 130, wherein the primary winding 110 electrically couples the superconducting current limiting device 10 to an external circuit 20 including, e.g., a voltage source Vs and a load resistor $R_L$, via terminals A and B. In the drawing, the primary winding 110 is in the form of a conductive coil and the superconductive element 120 is in the form of a superconductive ring.

In the electric device 5, a circuit current determined by the voltage source Vs and the total impedance of the electric device 5 flows via the load resistor $R_L$ and the primary winding 110. The total impedance is determined mainly by the load resistor $R_L$ and an additional impedance due to the superconducting current limiting device 10.

Hereinafter, the operations of the electric device 5 illustrated in FIG. 2 will be described with reference to FIG. 3.

In normal conditions, if a current below a transition point P in FIG. 3 flows into the primary winding 110, the superconductive element 120 maintains the superconducting state. Therefore, as described above with reference to FIG. 1, the reverse or opposite magnetic flux generated by the superconductive element 120 cancels the magnetic flux produced by the primary winding 110, which makes the inductance of the primary winding 110 nearly zero. As a result, since the impedance of the superconducting current limiting device 10 is determined only by the leakage inductance therein and the resistance of the primary winding 110, the additional impedance due to the superconducting current limiting device 10 becomes very low, thereby allowing the normal current to flow through the electric device 5 without experiencing a considerable impedance change due to the superconducting current limiting device 10.

On the other hand, in fault conditions, if a fault current above the transition point P in FIG. 3, caused by, e.g., a transient load impedance change or power supply surge, flows into the primary winding 110, the superconductive element 120 goes to the resistive state since the fault current generates a magnetic flux in the primary winding 110 which induces a current above the critical level within the superconductive element 120. Therefore, the magnetic flux generated by the primary winding 110 cannot be cancelled out by the reverse magnetic flux generated by the superconductive element 120 as explained above in connection with FIG. 1. Accordingly, once the transition from the superconducting state to the resistive state occurs in the superconductive element 120, the resultant net magnetic flux suddenly increases the inductance seen via the terminals A and B; and so does the impedance of the superconducting current limiting device 10. As a result, the total impedance of the electric device 5 abruptly increases and, thus, the level of the fault current flowing through the electric device 5 can be limited.

However, as shown in FIG. 3, if the fault current is not limited by the impedance change caused by the superconducting current limiting device 10 and approximates to a saturation point Q where the magnetic core 130 is saturated, the inductance of the primary winding 110 drops to a significantly small value; and so does the additional impedance by the superconducting current limiting device 10. Consequently, if the magnetic core 130 is finally saturated, an enormously large fault current may flow through and damage the external circuit 20.

Such saturation problems may be overcome by designing the superconducting current limiting device to support a high saturation current. However, this may lead to a significant increase in size, weight and cost of each element, especially, the magnetic core, in the superconducting current limiting device.

SUMMARY OF THE INVENTION

It is, therefore, a primary object of the invention to provide a superconducting current limiting device employing a magnetic core which has a gap and a damping element to thereby solve the saturation problems of the magnetic core without any additional increase in the cross sectional area of the magnetic core.

In accordance with the present invention, there is provided a device for limiting a current in an electric circuit, comprising:

a magnetically saturable core having a saturated and a non-saturated states; and an input coil for electrically coupling the core to the electric circuit, the input coil drawing the current therethrough so that a magnetic flux is generated in the core;

wherein the core includes a main path for drawing the generated magnetic flux and at least two magnetic paths, a first of the magnetic paths drawing a first portion of the magnetic flux; and a second of the magnetic paths drawing a second portion of the magnetic flux and having a damping element for cancelling at least a fraction of the second portion of the magnetic flux to thereby prevent the core from getting into the saturated state.

BRIEF DESCRIPTION OF THE DRAWINGS

The above and other objects and features of the present invention will become apparent from the following description of preferred embodiments given in conjunction with the accompanying drawings, in which.

DETAILED DESCRIPTION OF THE PREFERRED EMBODIMENTS

Figure 4:
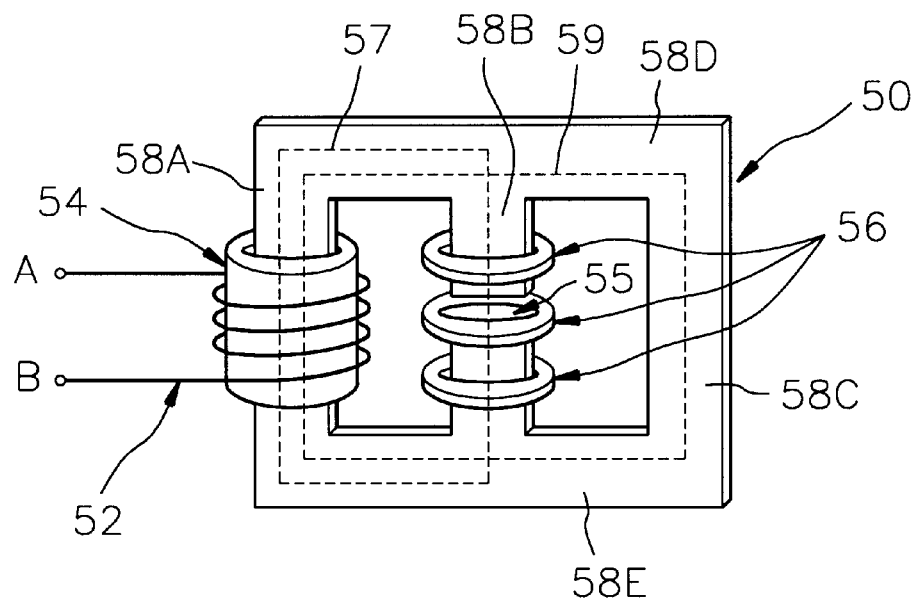
FIG. 4 depicts a superconducting current limiting device in accordance with a first embodiment of the present invention.
Figure 5:
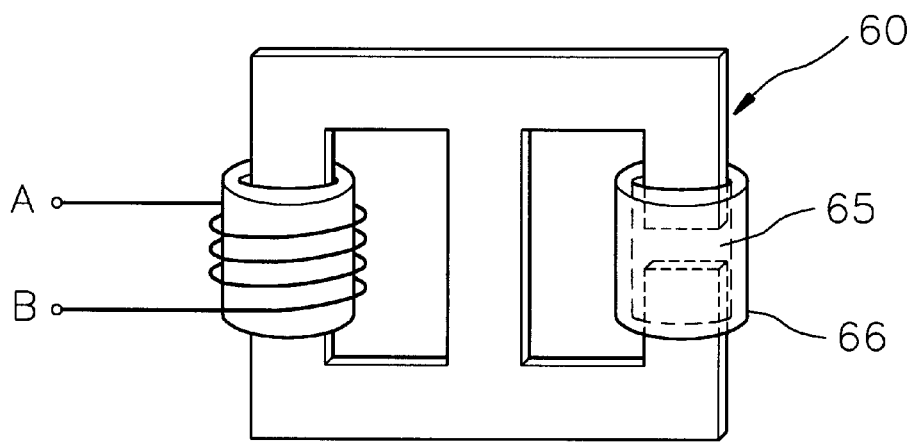
FIG. 5 provides a superconducting current limiting device in accordance with a second embodiment of the present invention.
Figure 6:
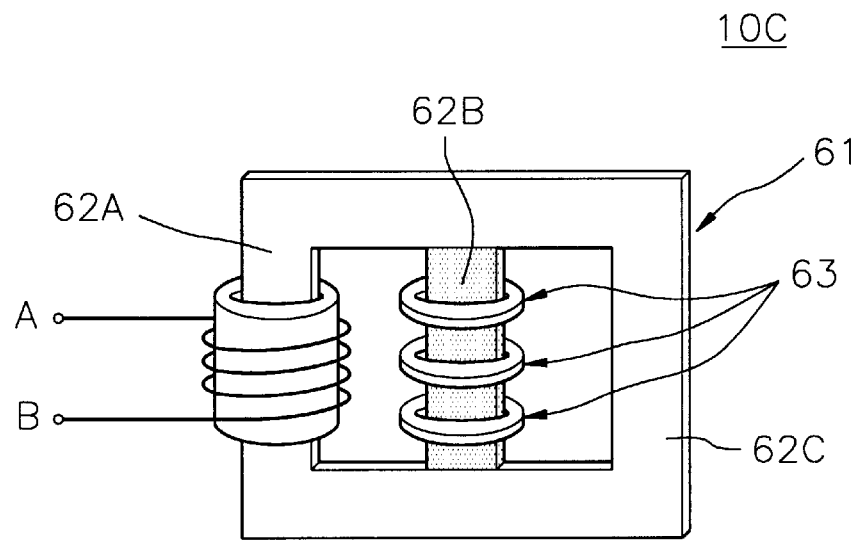
FIG. 6 supplies a superconducting current limiting device in accordance with a third embodiment of the present invention.

Referring to FIGS. 4 to 6, there are presented superconducting current limiting devices in accordance with the preferred embodiments of the present invention.

In FIG. 4, there is provided a superconducting current limiting device 10A in accordance with a first embodiment of the present invention.

The superconducting current limiting device 10A comprises a magnetic core 50 which has a plurality of, e.g., three magnetic branch elements (or legs), e.g., a first to a third magnetic legs 58A to 58C, extending between two elongated members (or yokes), e.g., an upper yoke 58D and a lower yoke 58E. The magnetic core 50 may be made of any magnetically saturable material having a saturated and a non-saturated states and the second magnetic leg 58B has a gap, e.g., an air gap 55, occupied by a material whose permeance is smaller than that of the magnetic core 50. In addition, the superconducting current limiting device 10A is coupled with an external circuit (not shown) through the use of an input coil, i.e., a primary winding 52, connected to the external circuit via two terminals, e.g., A and B, as in the electric device shown in FIG. 2. The superconducting current limiting device 10A also comprises a superconductive element 54 as in FIG. 2 and further a damping element 56 encircling the second magnetic leg 58B having the gap 55.

The primary winding 52 is in the form of a coil with predetermined turns wound around, preferably, a magnetic leg without a gap, e.g., the first magnetic leg 58A or the superconductive element 54, and is made of a conductive material which can be either a superconductive material or a non-superconductive, i.e., normal conductive, material. The superconductive element 54 is made of a superconductor in the form of, e.g., one or more rings, cylinders, short-circuited coils or the like, wherein a yoke or a magnetic leg without a gap extends therethrough.

The primary winding 52 and the superconductive element 54 can be located at any part or parts of the magnetic core 50 other than a magnetic leg with a gap. To be more specific, the primary winding 52 and the superconductive element 54 can be located together side-by-side, as in FIG. 2, or one of those can be positioned inside or outside the other, as shown in FIGS. 4 and 5, on either a certain magnetic leg without a gap or a yoke of the magnetic core 50. Alternatively, one of the primary winding 52 and the superconductive element 54 can be positioned on a yoke or a leg having no gap while the other resides on a different yoke or a different leg having no gap. It is preferable, however, that the primary winding 52 and the superconductive element 54 are positioned together, i.e., one being inside or outside the other as shown in FIGS. 4 and 5. If the primary winding 52 and the superconductive element 54 are separately positioned on the magnetic core 50, there may occur leakage flux which may not be cancelled out by the superconductive element 54, thereby deteriorating the magnetic flux cancellation effect of the superconductive element 54.

In the preferred embodiment of the invention, the damping element 56 is made of a superconductive material and is in the form of one or more rings, cylinders, short-circuited coils or the like through which a magnetic leg with a gap, e.g., the second magnetic leg 58B, extends. For instance, in the embodiment shown in FIG. 4, the damping element 56 employs three superconductive rings axially stacked against each other to encircle the second magnetic leg 58B.

Hereinafter, the operation of the superconducting current limiting device 10A will be described with reference to FIGS. 3 and 4.

In normal conditions, i.e., if a normal current, within a certain predetermined range, e.g., below P shown in FIG. 3, flows into the primary winding 52, the superconductive element 54 maintains the superconducting state since a magnetic flux, inducing a current below a critical level within the superconductive element 54, is generated due to the normal current in the primary winding 52. Therefore, the magnetic flux generated by the primary winding 52 is cancelled out by a corresponding reverse magnetic flux produced by the superconductive element 54 and there will be no magnetic flux passing through the magnetic core 50. As a result, the inductance seen via the terminals A and B becomes very low, rendering the impedance of the superconducting current limiting device 10A to be low, and the superconducting current limiting device 10A has a negligible influence on the operation of the external circuit.

On the other hand, in fault conditions, if a fault current flowing into the primary winding 52 exceeds the predetermined range and generates a magnetic flux which induces a current exceeding the critical level within the superconductive element 54, the superconductive element 54 goes to the resistive state, thereby losing its magnetic flux cancellation characteristic feature. Therefore, the impedance of the superconducting current limiting device 10A increases and, thus, the level of the fault current flowing through the external circuit can be limited.

Figure 1:
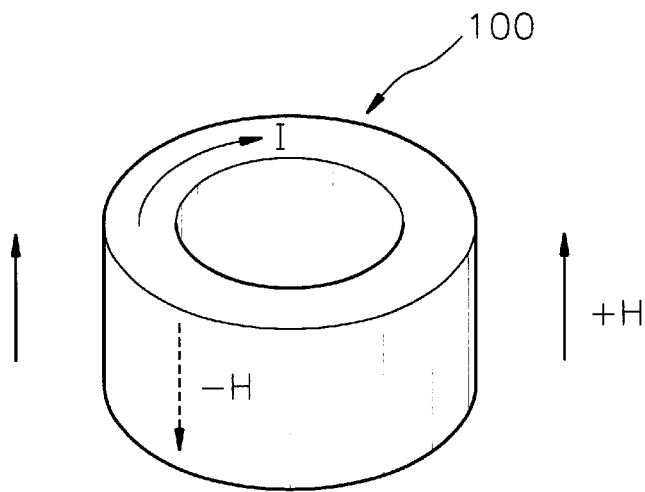
FIG. 1 illustrates the magnetic flux cancellation effect of a superconductor.
Figure 2:
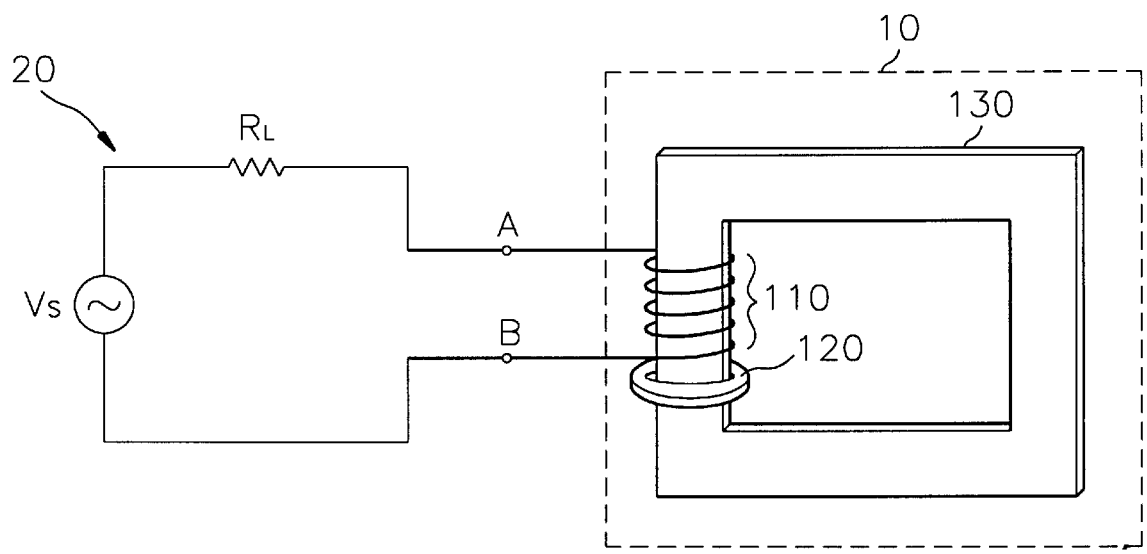
FIG. 2 shows an electric device employing a conventional superconducting current limiting device.
Figure 3:
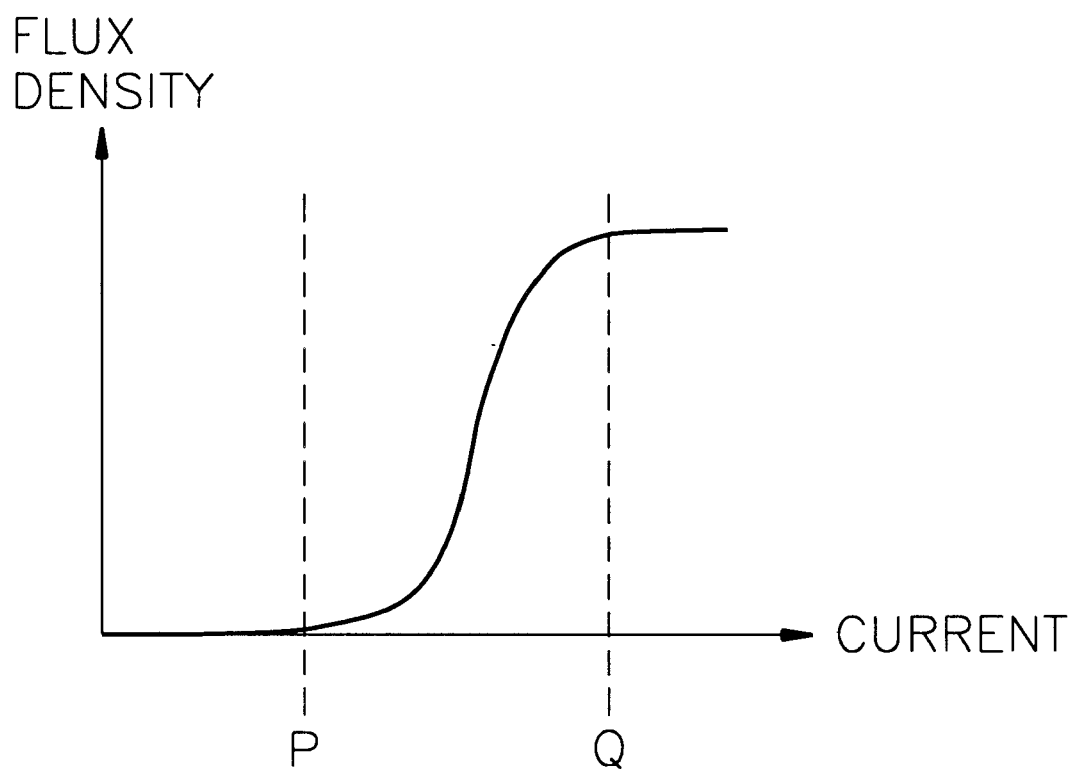
FIG. 3 pictorializes a magnetization curve of a magnetic core in a superconducting current limiting device.

In the conventional superconducting current limiting device shown in FIG. 2, if the fault current is not suppressed and instead continuously increases to approach a saturation point, e.g., Q shown in FIG. 3, where the magnetic core 50 is saturated, the impedance of the superconducting current limiting device 10A rapidly decreases again so that an enormously large fault current may flow through and damage the external circuit.

In accordance with the present invention, however, such a saturation problem can be solved by retarding or preventing the saturation of the magnetic core 50 through the use of the combined function of the gap 55 and the damping element 56 of the second magnetic leg 58B.

Specifically, in the fault conditions, two parallel magnetic paths, i.e., a first closed path 59 via the first and the third magnetic legs 58A, 58C and a second closed path 57 via the first and the second magnetic legs 58A, 58B, are formed in the magnetic core 50 in accordance with the magnetic flux density in the magnetic core. In other words, there exist three magnetic paths in the magnetic core 50, i.e., a major magnetic path via the first magnetic leg 58A for a total magnetic flux generated in the magnetic core 50, a primary magnetic path via the third magnetic leg 58C for a majority of the total magnetic flux and a secondary magnetic path via the second magnetic leg 58B for the remainder of the total magnetic flux.

More specifically, until the third magnetic leg 58C is saturated, the permeance of the third magnetic leg 58C of the magnetic core 50 is greater than that of the second magnetic leg 58B having the gap 55 and the damping element 56 since the permeance of the second magnetic leg 58B is very low and nearly constant due to the gap 55. Therefore, the magnetic flux generated by the primary winding 52 dominantly flows along the first closed path 59. As the magnetic flux becomes strong and, thus, the magnetic flux passing through the magnetic legs 58A and 58C approaches the saturation point, the permeance of the third magnetic leg 58C decreases while the second magnetic leg 58B maintains the nearly constant permeance. Therefore, the magnetic flux starts to flow along the second closed path 57. The condition for the magnetic flux distribution among the magnetic legs may be controlled by the characteristics of the magnetic core 50, e.g., the gap distance of the gap 55.

In detail, if a relatively low fault current flows into the primary winding 52 and the permeance of the third magnetic leg 58C is still greater than that of the second magnetic leg 58B having the gap 55, the magnetic flux generated by the primary winding 52 predominantly flows through the third magnetic leg 58C, i.e., along the first closed path 59, whereas the proportion of magnetic flux flowing through the second magnetic leg 58B, i.e., the second closed path 57, is negligible.

However, as the fault current increases and the magnetic flux passing through the third magnetic leg 58C approaches the saturation point, the permeance of the third magnetic leg 58C decreases and the proportion of the magnetic flux flowing through the third magnetic leg 58C gradually decreases. On the other hand, the permeance of the second magnetic leg 58B remains constant as described above and, consequently, the proportion of the magnetic flux flowing through the second magnetic leg 58B gradually increases. However, since the proportion of the magnetic flux flowing through the second magnetic leg 58B is still small compared with that of the third magnetic leg 58C, the damping element 56 always maintains its magnetic flux cancellation characteristic. Therefore, the magnetic flux flowing through the second magnetic leg 58B is cancelled out by a reverse magnetic flux generated by the damping element 56. Accordingly, there is no magnetic flux passing through the second magnetic leg 58B and the magnetic flux passing through the magnetic core 50 does not readily reach its saturation point due to the cancellation of the magnetic flux along the second magnetic leg 58B. As a result, the saturation problems of the magnetic core 50 do not occur and the abrupt increase of the fault current can also be avoided.

In this embodiment, the amount of the magnetic flux passing through the second magnetic leg 58B is proportional to a ratio of the third magnetic leg reluctance to the second magnetic leg reluctance. That is, as the permeance of the third magnetic leg 58C decreases, the magnetic flux passing through the second magnetic leg 58B increases, which is, however, cancelled out by the damping element 56.

As illustrated above, in accordance with the present invention, since a portion of the magnetic flux generated by the fault current is cancelled out by the damping element 56, thereby preventing the magnetic core 50 from getting into the saturated state, the superconducting current limiting device 10A can detect and limit the fault current without any external control unit.

Referring to FIG. 5, there is shown a superconducting current limiting device 10B in accordance with a second embodiment of the present invention, wherein the superconducting current limiting device 10B comprises a magnetic core 60 having a gap 65 and a damping element 66.

In this embodiment, the second and the third magnetic legs of the magnetic core 60 are transposed to each other and the damping element 66 is in the form of a superconductive cylinder in lieu of the superconductive rings shown in FIG. 4.

Except the position of the second and the third magnetic legs and the form of the damping element, the superconducting current limiting device 10B in this embodiment is functionally identical to the device 10A shown in FIG. 4; and, therefore, the explanation for the structure and operation thereof will be omitted.

In FIG. 6, there is shown a superconducting current limiting device 10C in accordance with a third embodiment of the present invention, wherein the superconducting current limiting device 10C comprises a magnetic core 61 having a first to a third legs 62A to 62C and a damping element 63.

In this embodiment, the entirety of the second magnetic leg 62B of the magnetic core 61 is made of a material whose permeance is smaller than that of the third leg 62C, in contrast to the second leg 58B in FIG. 4 a portion of which is a gap filled with a low permeance material.

Since the superconducting current limiting device 10C in this embodiment is functionally identical to the device 10A shown in FIG. 4, the explanation for the structure and operation thereof will be omitted.

Even though the preferred embodiments have been described with respect to the magnetic cores, each having three magnetic legs, the number of magnetic legs can be varied. For instance, the magnetic core may include one or more magnetic legs, each having a gap and a damping element, so as to enhance the characteristic for distributing the magnetic flux to thereby effectively prevent the magnetic core from being saturated. Similarly, the number of the magnetic legs without a gap and a damping element may be designed to be greater than two.

As described above, in accordance with the present invention, since the saturation of the magnetic core is effectively prevented, the superconducting current limiting device can avoid the abrupt decrease of the inductance of the primary winding under the fault conditions. As a result, the improved current-limiting performance is achieved.

In addition, since the superconducting current limiting device prevents the saturation problem without any additional increase in the cross sectional area of the magnetic core, the manufacturing cost of the superconducting current limiting device can be greatly reduced.

The current limiting characteristic achieved by means of a gap and a damping element of the present invention can be employed in a conventional inductor (or regulator) for regulating a fluctuation of a current in an electric circuit.

Figure 7:
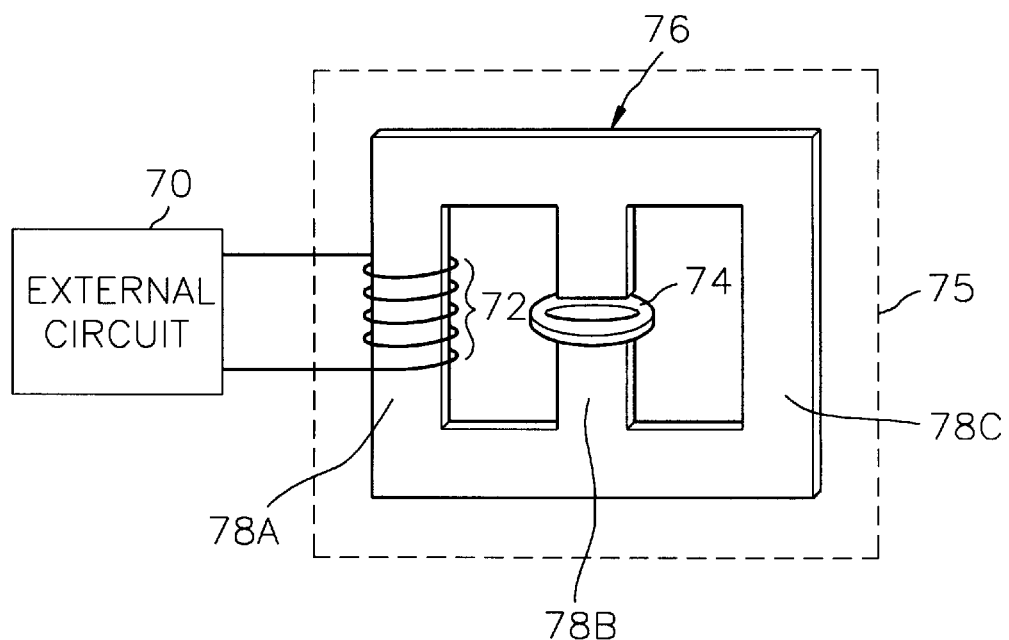
FIG. 7 offers an inductor in accordance with the present invention.

Referring to FIG. 7, there is shown an inductor 75 connected to an external circuit 70 in accordance with the present invention.

The inductor 75 comprises a magnetic core 76 having three magnetic legs 78A, 78B and 78C, wherein a primary winding 72 is arranged at the first magnetic leg 78A and a damping element 74 being in the form of, e.g., a superconductive ring encircles the second magnetic leg 78B having a gap. The magnetic core 76 may include more than three magnetic legs but should include at least one magnetic leg having a gap and more than one magnetic leg having no gap.

In the structure of the inductor 75, the primary winding 72 can be located at any parts of the magnetic core 76 except the magnetic leg with the gap.

If a fault current is coupled to the inductor 75, causing the magnetic core 76 to approach its saturated state, a portion of the magnetic flux generated by the fault current passing through the primary winding 72 starts to pass through the second magnetic leg 78B and is cancelled out by the magnetic flux generated by the damping element 74. As a result, as described in the former embodiments, the saturation of the magnetic core 76 in the inductor 75 can be avoided and the fault current is limited.

Furthermore, the current limiting characteristic can also be obtained from a transformer by employing a magnetic leg having a gap and a damping element of the present invention.

Figure 8:
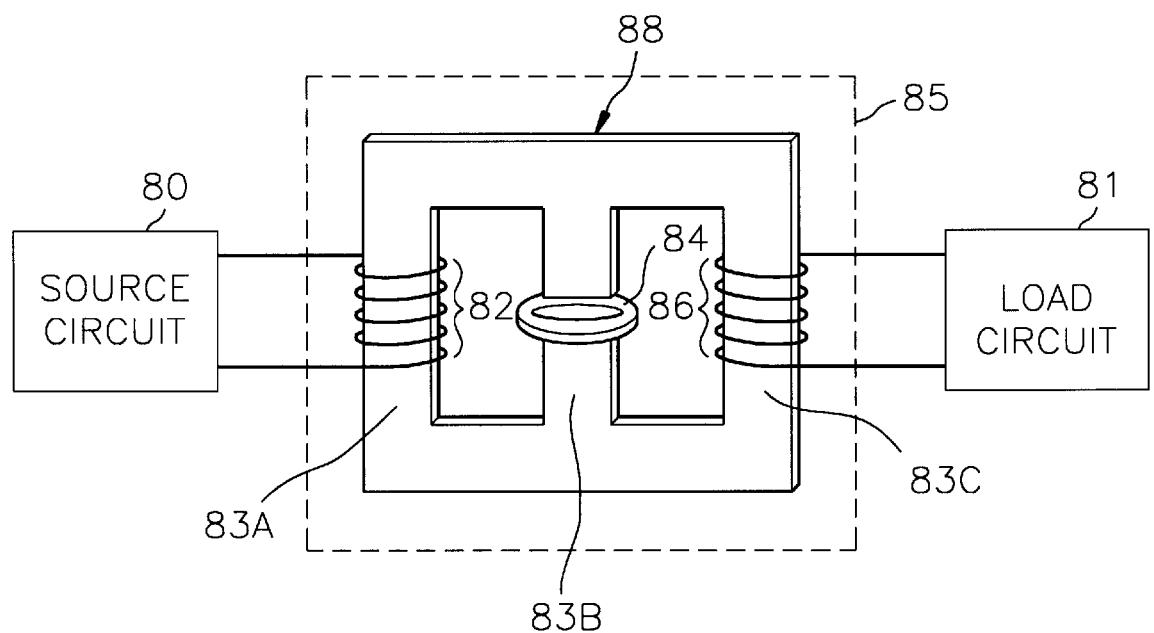
FIG. 8 presents a transformer in accordance with the present invention.

In FIG. 8, there is provided a transformer 85 connected to a source circuit 80 and a load circuit 81.

The transformer 85 comprises a magnetic core 88 having a multiplicity of, e.g., three, magnetic legs 83A, 83B and 83C, the magnetic legs including at least one magnetic leg having a gap and two or more magnetic legs having no gap. A primary winding 82 is positioned at the first magnetic leg 83A having no gap and connected to the source circuit 80. A secondary winding 86 is positioned, e.g., at the third magnetic leg 83C having no gap and connected to the load circuit 81. The primary and secondary windings 82 and 86 can be made of a superconductive or a non-superconductive material. The primary winding 82 serves to provide an input power from the source circuit 80 to the transformer 85 and the secondary winding 86 serves to provide the load circuit 81 with an output electric power induced by the magnetic flux which is generated by the primary winding 82 and passes through the third leg 83C. A damping element 84 may be in the form of a superconductive ring and encircles the second magnetic leg 83B having a gap.

In the structure of the transformer 85, the primary winding 82 and the secondary winding 86 can be positioned at any parts of the magnetic core 88 except the magnetic leg with the gap.

If a fault current is coupled to the primary winding 82 or the secondary winding 86, thereby causing the magnetic core 88 to approach its saturated state, a fraction of the magnetic flux, generated by the fault current and passing through the magnetic legs 83A and 83C, starts to pass through the second magnetic leg 83B and is cancelled out by the damping element 84. As a result, as described in the former embodiments, the saturation of the magnetic core 88 may be avoided and the increase of the fault current may also be suppressed. As described above, the abrupt increase of the fault current flowing into a transformer can be effectively prevented through the use of the magnetic core with a gap and a damping element and the transformer can be free from the damage incurred by the abnormal fault current.

In the embodiments of the present invention described above, the damping elements are preferably made of a superconductive material in order to maximize the magnetic flux cancellation characteristic. The damping elements can also be made of a normal non-superconductive material, e.g., Cu or Al. In such a case, however, the magnetic flux cancellation effect would be greatly reduced due to relatively high intrinsic electric resistance thereof.

The damping elements of the present invention can assume any form, e.g., one or more cylinders, rings, short-circuited coils or the like, as long as it can provide one or more closed paths for the current induced by the external magnetic flux.

The gap distance could be a critical design parameter for controlling the magnetic flux distributing characteristic between the magnetic legs, which in turn governing the current limiting characteristic of the present invention.

The whole second magnetic legs 78B and 83B of the inductor 75 and the transformer 85 shown in FIGS. 7 and 8 can also be made of a low permeance material as shown in FIG. 6.

Further, even though not explicitly illustrated in the descriptions of the preferred embodiments of the invention, it should be apparent to those skilled in the art that the elements made of the superconductive material should be kept below a critical temperature of the superconductive material of which they are composed in order to maintain their superconducting states through the use of, e.g., a cryostat supplied with a coolant.

Any of the known high temperature or low temperature superconductive material can be used in the present invention. However, the superconductive material employed in the invention is preferably a high temperature superconductive material which has a critical temperature that allows the use of a coolant, e.g., liquid nitrogen.

While the present invention has been described with respect to certain preferred embodiments only, other modifications and variations may be made without departing from the spirit and scope of the present invention as set forth in the following claims.

What is claimed is:

1. A device for limiting a current in an electric circuit, comprising:

a magnetically saturable core having saturated and non-saturated states; and an input coil for electrically coupling the core to the electric circuit, the input coil drawing the current therethrough so that a magnetic flux is generated in the core;

wherein the core includes a main path for drawing the generated magnetic flux and at least two magnetic paths, a first of the magnetic paths drawing a first portion of the magnetic flux; and a second of the magnetic paths drawing a second portion of the magnetic flux and having a damping element for cancelling at least a fraction of the second portion of the magnetic flux to thereby prevent the core from getting into the saturated state.

2. The device according to claim 1, wherein the second magnetic path has means for causing the proportion of the second portion of the magnetic flux with respect to the first portion thereof to be negligible when the core is in the non-saturated state and to become large as the core approaches the saturated state.

3. The device according to claim 2, wherein the causing means is a gap.

4. The device according to claim 3, wherein the gap is an air gap.

5. The device according to claim 2, wherein the causing means is made of a material whose permeance is smaller than that of the first magnetic path.

6. The device according to claim 2, wherein the damping element is made of a superconductive or a non-superconductive material and is in the form of one or more rings, cylinders or short-circuited coils.

7. The device according to claim 2, further comprising superconducting means for causing a major portion of the generated magnetic flux being cancelled when the current passing through the input coil is within a predetermined range, the superconducting means being of a resistive state when the current exceeds the predetermined range, rendering consequent increase in an impedance of the device.

8. The device according to claim 7, wherein the causing means is a gap.

9. The device according to claim 8, wherein the gap is an air gap.

10. The device according to claim 7, wherein the causing means is made of a material whose permeance is smaller than that of the first magnetic path.

11. The device according to claim 7, wherein the damping element is made of a superconductive or a non-superconductive material and is in the form of one or more rings, cylinders or short-circuited coils.

12. The device according to claim 7, wherein the superconducting means is positioned at the main or the first magnetic path.

13. The device according to claim 12, wherein the superconducting means is in the form of one or more rings, cylinders or short-circuited coils.

14. The device according to claim 13, wherein the superconducting means is positioned inside or outside the input coil along the main or the first magnetic path.

15. The device according to claim 2, further comprising an output coil, positioned along the main or the first magnetic path and coupled to a load circuit, for providing the load circuit with an electric power induced by the magnetic flux passing through the path along which the output coil is positioned.

16. The device according to claim 15, wherein the damping element is made of a superconductive or a non-superconductive material and is in the form of one or more rings, cylinders or short-circuited coils.

17. The device according to claim 15, wherein the causing means is a gap.

18. The device according to claim 17, wherein the gap is an air gap.

19. The device according to claim 15, wherein the causing means is made of a material whose permeance is smaller than that of the first magnetic path.

20. The device according to claim 15, wherein the output coil is positioned along the main or the first magnetic path.

21. The device according to claim 20, wherein the output coil is made of a superconductive or a non-superconductive material.

* * * * *